United States Patent [19]

Bergler

[11] Patent Number: 4,537,105

[45] Date of Patent: Aug. 27, 1985

[54] CIRCULAR CROSS-CUT AND MITER SAW BOX

[75] Inventor: Otto Bergler, Mühlacker-Lomersheim, Fed. Rep. of Germany

[73] Assignee: Black & Decker Overseas AG, Vaduz, Liechtenstein

[21] Appl. No.: 638,694

[22] Filed: Aug. 8, 1984

[30] Foreign Application Priority Data

Aug. 16, 1983 [DE] Fed. Rep. of Germany ....... 3329496

[51] Int. Cl.³ .................................................. B27B 5/20
[52] U.S. Cl. ..................................... 83/471.3; 83/574; 83/486.1; 83/581
[58] Field of Search ..................... 83/471.3, 574, 486.1, 83/488, 581

[56] References Cited

U.S. PATENT DOCUMENTS

| | | | |
|---|---|---|---|
| 1,866,888 | 7/1932 | Hawley | 83/471.3 |
| 2,502,640 | 4/1950 | Coleman | 83/471.3 X |
| 3,483,901 | 12/1969 | Ray | 83/471.3 |
| 4,152,961 | 5/1979 | Batson | 83/471.3 |

FOREIGN PATENT DOCUMENTS 1628992 11/1972 Fed. Rep. of Germany .
2929932 2/1980 Fed. Rep. of Germany .

OTHER PUBLICATIONS

Article, Haffner Co., Germany (one page), publication date unknown.

Primary Examiner—Donald R. Schran
Attorney, Agent, or Firm—Burns, Doane, Swecker & Matis

[57] ABSTRACT

A saw mechanism comprises a work support, a round table rotatably carried on said work support, and a pivot support carried by the table. A guide is mounted on the pivot support for pivotal movement and includes a pair of parallel rods. A saw includes a saw housing and a motor driven blade on the housing. The housing has a pair of passages which slidably receive the rods so that the housing can be adjusted relative to and along the rods.

8 Claims, 5 Drawing Figures

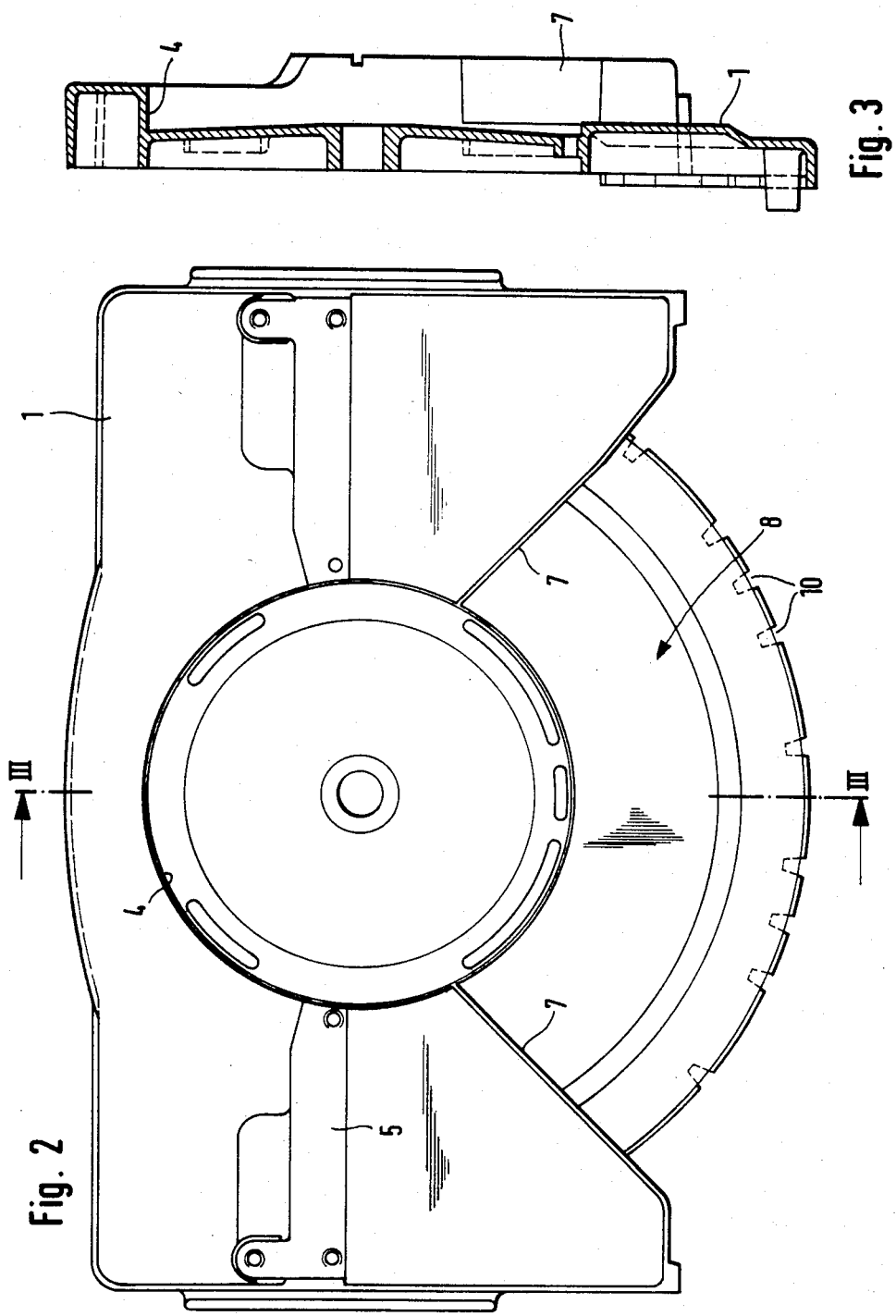

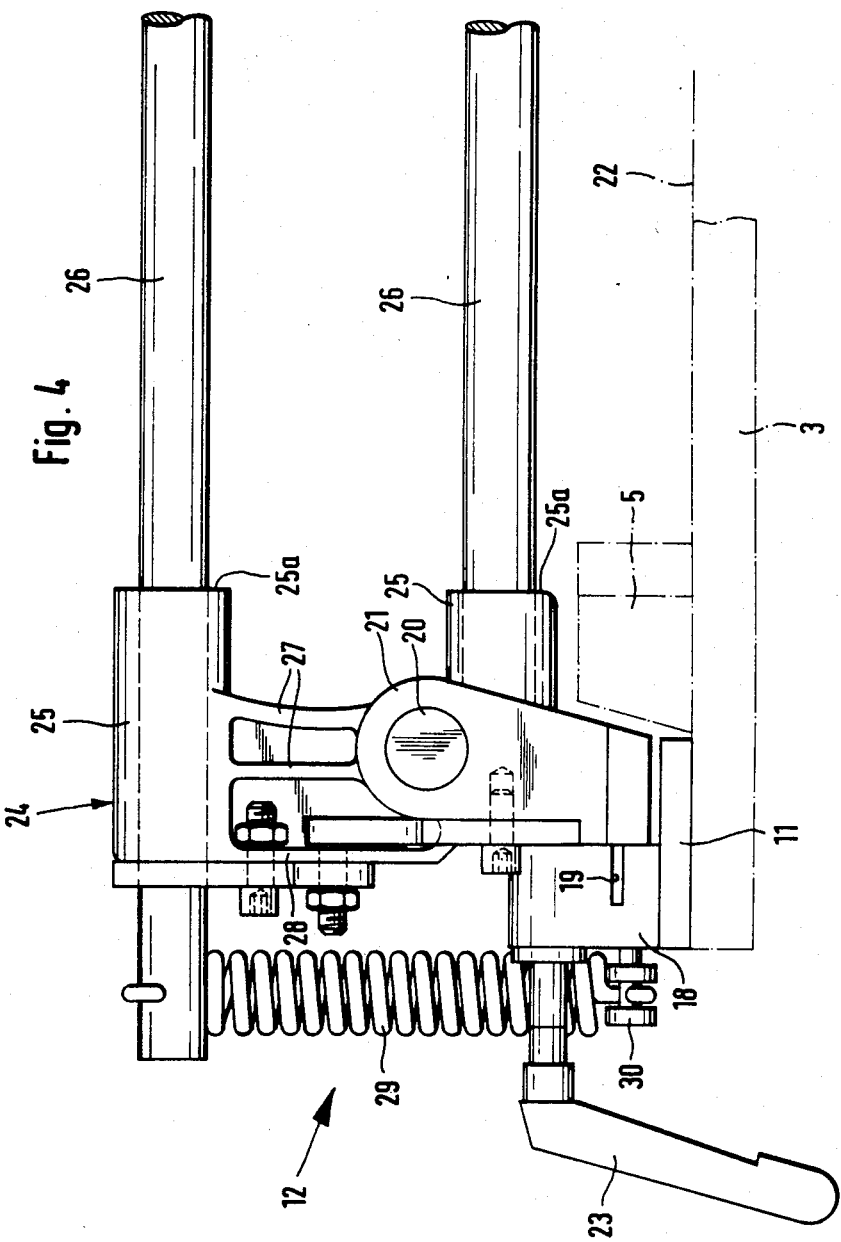

CIRCULAR CROSS-CUT AND MITER SAW BOX

BACKGROUND AND OBJECTS OF THE INVENTION

The invention relates to a circular cross-cut and miter box which comprises a saw assembly including a motor-driven saw blade held on a pivoting arm. The pivoting arm is bearingly supported on a rotatable holder which includes an insertion slit for receiving the saw blade.

Circular cross-cut and miter box saws are known in numerous configurations. German Auslegeschrift No. 1 628 992 shows an embodiment wherein the swiveling saw assembly, which in view of the 180° rotating range of the work table may also be used as a table saw, is mounted on a manually actuated pivoting arm. The bearing support for the pivoting arm is carried by a round table which is rotatably mounted in the rotatable work plate. Circular cross-cut and miter box saws of this type have the advantage that long workpieces may be miter cut by pivoting the round table, without having to alter the support position of the workpiece.

A certain disadvantage of circular cross-cut and miter box saws of this type involves the fact that the cutting range depends exclusively on the size of the saw blade and its depth of immersion, so that for example, boards exceeding a certain width, cannot be processed.

For the processing of wide workpieces table miter saws have already been proposed, e.g., by the Haffner Co., wherein the pivot support for the pivoting arm is located on a longitudinal guide extending parallel to the insertion slit for the saw blade and consisting of a sleeve which slides upon round rods, the rods being fixedly joined to a support table for the workpiece. Such jack saws may also be used as cross-cut saws, but for miter cuts the position of the workpiece on the support table must be altered. A relatively large distance exists between the saw blade and the longitudinal guide. The unavoidable play on the longitudinal guide thus leads to inaccuracies on the workpiece during cutting.

In German Offenlegungsschrift No. 29 29 932 there is disclosed a guide arm which is slidably mounted in a bushing, the latter being fixedly mounted on a rotatable table. The saw housing is fixed to the guide arm whereby the saw can be moved in the direction of the arm as the arm slides within its bushing. In such an arrangement, as in the Haffner Co. saw described above, the saw housing is spaced a relatively long distance from the point where relative longitudinal movement of the guide assembly (i.e., the movement of the guide arm within the bushing). Thus, relative play between the guide arm and the bushing, even if small in itself, will be magnified at the location of the cut due to the long distance of the blade housing from the location of the play.

It is the object of the invention to provide a circular cross-cut and miter box saw of the afore-mentioned type such that the cutting range is enlarged.

SUMMARY OF THE INVENTION

This object is attained in the case of a circular cross-cut and miter box saw of the initially described type in that the pivoting arm is in the form of longitudinal rods extending parallel to the plane of the saw blade and the saw holder itself includes guide passages in which the rods are slidably received. This minimizes the distance between any "play" and the location of the cut, especially by locating the guide passages immediately adjacent the axis of rotation of the blade.

Preferably, the support for the workpiece comprises a recess corresponding to the miter cut range for the saw blade. A radial arm projects from the round table and is movably disposed within the recess.

In view of this configuration the circular cross-cut and miter box saw according to the present invention may also be used as a jack saw, with such usage by virtue of the new layout not being restricted to 90° cuts, but applicable to all miter cut angles. It is not necessary in the process to alter the position of the workpiece on the work support. Furthermore, the longitudinal guidance of the saw assembly (as viewed from the saw blade) is located in front of the pivot bearing and thus quite close to the saw blade and improved cutting accuracies may be obtained with novel configuration. The new cross-cut, miter and jack saw may, however, still be used, similarly to the known types, for the processing of small workpieces or under the same kinematic conditions. It remains small and readily manipulated, as the weight distribution with respect to the point of rotation may be maintained optimal. Handling is extremely simple, because initially the known pivoting process is effected for the immersion of the saw blade, followed by the draw cut as needed.

An advantageous embodiment is obtained further by equipping the holder with a unilaterally projecting workpiece bracket arm, the length whereof correspoinds to the length of the draw cut and which is provided with an insertion slit.

In this configuration the bounding walls of the recess in the workpiece support form the stops for the support arm and thus the limits of the pivoting of the round table.

In an especially simple manner the longitudinal guidance for the saw assembly may be constituted by two round rods, located parallel above each other and displaceably located in bores of the housing of the saw assembly. This embodiment has the advantage that the longitudinal guidance is integrated directly in the saw housing, while appropriately placing the round rods directly above and below the collector and brush holder of the motor and extending them on both sides of the bearing shaft of the saw blade. The longitudinal guide is thus located in the immediate vicinity of the saw blade. Cutting accuracy may therefore be maintained very high. A structural simplification may be obtained by arranging the motor and saw bearings and the bores for the longitudinal guide in a single housing, with the guiding bores for the round rods in the housing being long enough so that the round rods cannot exit from the guiding bore in the forward direction. This layout makes it possible to provide a closed housing on the operating side of the saw.

It is further advantageous to provide a return spring on the longitudinal guide forming the pivot arm, the spring maintaining the longitudinal guide always in the upper position, when it is not depressed by the operator. This configuration yields the advantage that the saw assembly is always returned by the force of gravity in the area of the pivot bearing, so that for a new work cycle the same initial conditions as with conventional circular cross-cut and miter saws are always present and there is only a short swiveling distance to be traveled to the workpiece.

THE DRAWING

The object and advantages of the invention will become apparent from the following detailed description of a preferred embodiment thereof, in connection with the accompanying drawings, in which like numerals designate like elements, and in which:

FIG. 2 is a top view of the workpiece support table of FIG. 1, without the round table and the saw assembly;

FIG. 3 is a section taken through the workpiece support table of FIG. 2 along the line III—III;

FIG. 4 is a side elevational view of a pivot bearing for the saw assembly, and

DETAILED DESCRIPTION OF A PREFERRED EMBODIMENT OF THE INVENTION

Figure 1:
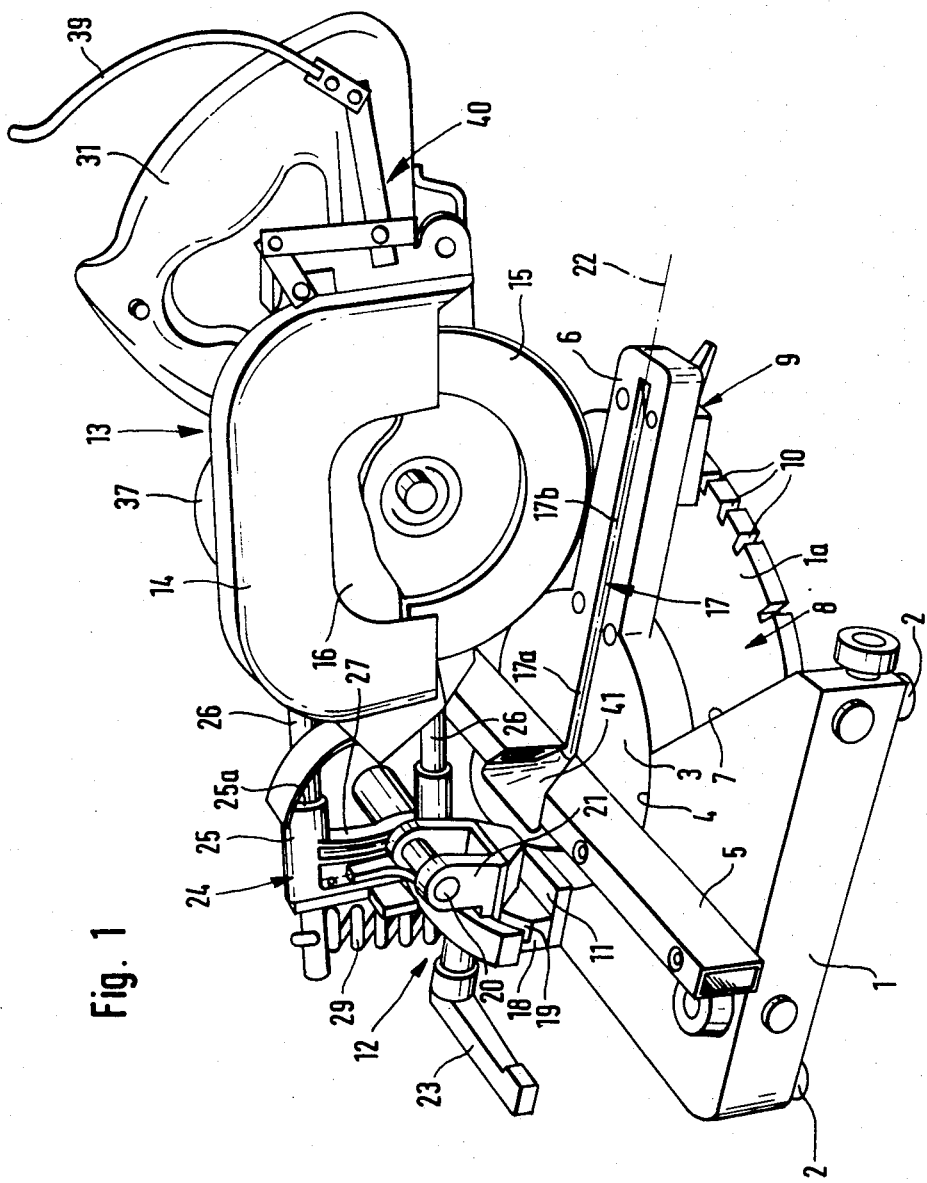
FIG. 1 shows a perspective view of the novel circular cross-cut and miter box saw.

FIG. 1 shows a workpiece support table 1 equipped with adjustable support legs 2. A round table 3 is pivotably mounted to the workpiece support table 1 in an appropriately dimensioned opening or recess 4 between a bottom 1a of the workpiece support table and a stop ledge 5 extending transversely over the round table. The round table 3 is provided integrally with a bracket arm 6 which, during the pivoting of the round table 3, moves within a recess 8 bounded by a pair of mutually oblique lateral walls 7. The position of the bracket arm 6 may be immobilized by engaging a locking device 9 within suitable notches 10, whereby the position of the round table 3 is also locked in.

A support plate 11 is fixedly connected with the round table 3. A pivot bearing 12 for a saw assembly 13 is mounted on the support plate 11, and is capable of executing cross-cut, miter and draw cuts as will be explained. For this purpose, a saw blade 16 (located in FIG. 1 behind an upper protective hood 14 and a lower, swiveling hood 15) is immersed into an insertion slit 17 comprising two mutually aligned portions 17a, 17b. The portion 17a extends approximately from the center of the round table 3 to its periphery, and the portion 17b is disposed in the bracket arm 6.

As seen in FIGS. 1 and 2, the pivot bearing 12 comprises a bearing block 18 fixedly connected with the support plate 11. The bearing block 18 includes a circular guide slot 19 within which a bearing block 21, equipped with a swivel axle 20 may be displaced. The bearing block 21 is thus adjustable about the center of curvature of the slot 19, i.e., about an axis 22. The axis 22 extends parallel to the saw blade 16 and passes across the top of the insertion slit 17 on the surface of the round table 3. The prevailing position of the bearing block 21 may be set for example by means of a scale and can be fixed by the tightening of a clamping lever 23, which thus presses the bearing block 21 against the bearing block 18.

A bearing yoke 24 is rotatably supported on the swivel axis 20 and comprises two sleeve-like bearing bodies 25 for receiving the round rods 26. The bodies 25 are mutually parallel and are interconnected by means of transverse braces 27 and 28. The upper round rod 26 extends through the body 25 and projects therefrom to the rear. A tension spring 29 is hooked into the end of the rod 26, the other end whereof is fixedly connected with the bearing block 18 by means of a holding bolt 30. This spring 29 insures that the round rods 26 and the yoke 24 are always brought into the position indicated in FIG. 1 (i.e., rotated counterclockwise about axle 20 in FIG. 4), wherein the guide rods 26 occupy their upper terminal position. The saw assembly 13, which moves freely on the rods 26, is normally held by the force of gravity in a left-hand terminal position wherein the saw housing (to be described below) abuts against the frontal sides 25a of the sleeve-like bearing bodies 25. In the position shown in FIG. 1, the saw assembly 13 is in its right-hand terminal position, in which it must be held by manual actuation with a handle 31.

Figure 5:
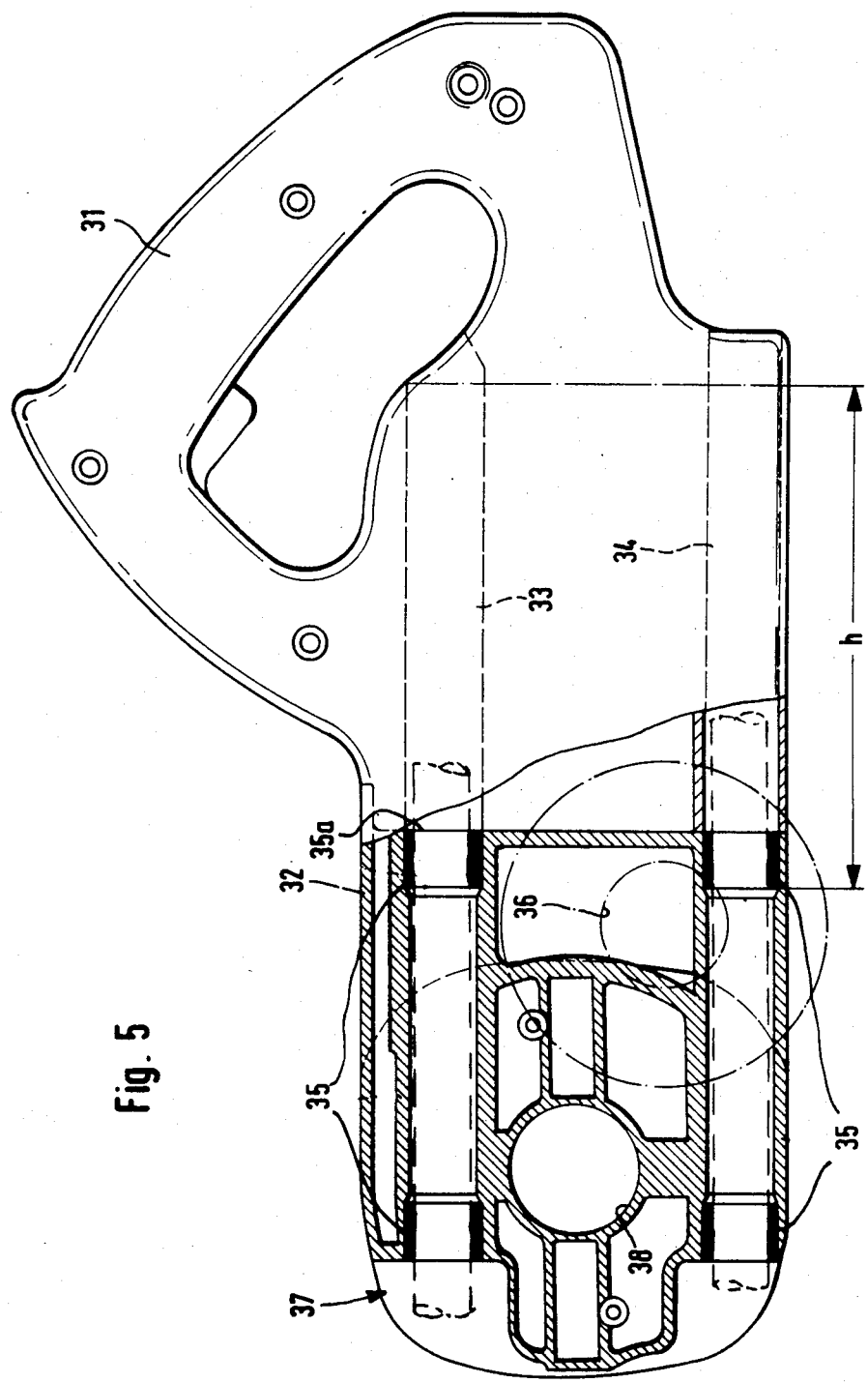
FIG. 5 is a partially sectioned view of the housing for the saw assembly without the protective hood and the saw blade.

It is seen in FIG. 5 that the saw housing 32, equipped with the manual handle 31, comprises a pair of cylindrically-shaped longitudinal guide passages 33 and 34, the internal diameter whereof is coordinated with the outer diameter of the round rods 26 to slidingly receive the latter. End sections of each of the longitudinal passages 33, 34 are provided with low friction guide bushings 35, abutting against the round rods 26 and assuring an accurate guidance. As seen in FIG. 5, the longitudinal passages 33 and 34 are long enough to assure that the round rods 26 remain within the guides 33 and 34 over the entire draw length h. In a manner not shown in detail, the draw rods 26 may be equipped on their free ends with stops abutting against frontal side 35a of the guide bushings 35 and preventing the extraction of the guide rods 26 from the longitudinal passages or bores 33 and 34.

The guide bushings 35 are each spaced laterally with respect to a bearing bore 36 for the saw blade 16 which is provided in the housing 32 and which defines the axis of rotation of the blade. The bushings 35 extend directly above and below a position of the collector and brush holder components of the drive motor. The motor is bearingly supported within a housing section 37 laterally projecting from the housing 32. The motor output shaft is disposed within a bore 38. This layout of the longitudinal guide passages 33 and 34, which also extend directly adjacent to the saw blade 16, yields an exact guidance of the saw housing 32. Cutting inaccuracies may be excluded almost entirely.

When using the novel circular cross-cut, miter and jack saw assembly, initially the workpiece to be processed is placed against the stop ledge 5. Subsequently, the bearing block 21 of the pivot bearing 12 is set so that the saw blade 16 is either perpendicular to the surface of the workpiece support table 1 or at an angle to it. The miter angle may be adjusted by setting the position of the rod table 3 and subsequently processing may be initiated by a lowering of the saw assembly (accompanied by a rotation of the yoke 24 about the axle 24) by means of the manual handle 31. Upon the gripping of the handle 31 by the operator, a manual lever 39 located in front of the handle 31 is necessarily also actuated and pressed against the manual handle 31, so that by means of a lever arrangement 40 the lower protective hood 15 is swiveled away from the saw blade 16. This mechanism for actuating the hood 15 is preferably used, but does not constitute the present invention. The upper hood 14 is fixedly connected with the saw housing 32 and may comprise a part of such housing. Following the immersion of the saw blade 16 into the slit 17, the entire saw assembly 13 may be displaced (to the left in FIG. 1) by means of the handle along the round rods 26, i.e., along the axle 22, so that a draw cut is possible. After cutting, the handle 31 is released. The protective hood 15 again pivots in front of the saw blade 16, and the spring 29 lifts the round rods 26 and the saw assembly upwards, into the position shown in FIG. 1. By its own weight, the saw assembly 13 slides into the left-hand position until it abuts against the frontal surfaces 25a of the sleeve-like bearing bodies 25. A new processing cycle may be initiated. In order to insure that the saw blade may enter the workpiece, the stop ledge 5 comprises in its center a recess 41, which depending on the pivoting range of the round table 3 and the possible swiveling of the saw assembly around the axle 22, expands to the rear and upward, as viewed from the abutting edge of the stop ledge 5.

It will be appreciated that the location of relative movement between the saw housing and the rods 26 is so close to the blade that very little inaccuracies in cutting will result from relative play between the rods 26 and the passages 33, 34.

Although the present invention has been described in connection with a preferred embodiment thereof, it will be appreciated by those skilled in the art that modifications, substitutions, deletions, and additions may be made without departing from the spirit and scope of the invention as defined in the appended claims.

What is claimed is:

1. A saw mechanism comprising:
 a work support including a circular opening and a recess communicating radially with said opening,
 a circular table rotatably carried in said circular opening of said work support and including an arm with an insertion slit projecting radially into said recess so as to be movable circumferentially within said recess, the circumferential extent of said recess corresponding to the range of the miter cut for the saw mechanism,
 a pivot support carried by said table,
 a guide means mounted on said pivot support for rotation about an axis extending generally transversely relative to said slit, said guide means including parallel rods projecting generally transversely relative to said axis, said rods lying in a common plane oriented perpendicularly to the plane of said table, and
 saw means comprising a saw housing and a motor driven blade rotatably carried by said saw housing for rotation about an axis, said saw housing having passages located directly therein which passages slidably receive said rods such that said saw housing can be adjusted relative to said table along said rods, said passages each disposed in the immediate vicinity of said axis of rotation of said blade and lying in a common plane oriented perpendicularly to said plane of said table in the immediate vicinity of the plane of said blade.

2. Apparatus according to claim 1, wherein said passages are spaced to opposite sides of said axis of rotation of said blade.

3. Apparatus according to claim 1, wherein said passages are of such length that said rods remain therein during the entire stroke of the saw housing along said rods.

4. Apparatus according to claim 1 including spring means for yieldably biasing said guide means to a position maintaining said saw housing in an uppermost position.

5. Apparatus according to claim 1 including a protective hood overlying an upper portion of said blade, said passages situtated below the uppermost extent of said hood.

6. Apparatus according to claim 1 including a motor mounted on said saw housing and including an output shaft received in a bearing bore of said housing, said passages being situated on opposite sides of said bearing bore.

7. Apparatus according to claim 3 including a motor mounted on said saw housing and including an output shaft received in a bearing bore of said housing, said passages being situated on opposite sides of said bearing bore.

8. Apparatus according to claim 4, wherein said spring means is connected between said table and said guide means.

* * * * *